United States Patent [19]

Grewe et al.

[11] Patent Number: 4,691,892

[45] **Date of Patent: * Sep. 8, 1987**

[54] SIGN AND SIGN STAND

[75] Inventors: Ronald E. Grewe; David U. Hillstrom, both of Novi, Mich.; James R. Seely, Avon; Cecil Ursprung, West Hartford, both of Conn.

[73] Assignee: Marketing Displays, Inc., Farmington Hills,, Mich.

[ * ] Notice: The portion of the term of this patent subsequent to Oct. 22, 2002 has been disclaimed.

[21] Appl. No.: 789,659

[22] Filed: Oct. 21, 1985

Related U.S. Application Data

[60] Continuation-in-part of Ser. No. 442,418, Nov. 17, 1982, Pat. No. 4,548,379, and Ser. No. 751,561, Jul. 3, 1985, Pat. No. 4,593,879, which is a division of Ser. No. 442,418, Nov. 17, 1982, and Ser. No. 719,623, Apr. 2, 1985, Pat. No. 4,569,499, which is a division of Ser. No. 442,378, Nov. 17, 1982, abandoned.

[51] Int. Cl.⁴ .......... F16M 13/00

[52] U.S. Cl. .......... 248/624; 40/602; 40/608; 40/611; 248/160; 248/170

[58] Field of Search .......... 248/166, 170, 160, 161, 248/624, 407, 599, 600, 601, 354.5, 121, 122, 124, 125; 40/602, 606, 607, 608, 611, 612; 292/219, 228; 403/108, 109, 330, 395, 398, 399

[56] References Cited

U.S. PATENT DOCUMENTS

| | | |
|---|---|---|
| 1,420,268 | 6/1922 | LaHodny . |
| 1,764,071 | 6/1930 | Foulke . |
| 1,854,478 | 4/1932 | Meyers . |
| 1,972,959 | 9/1934 | Taylor . |
| 2,167,564 | 7/1939 | Fonda . |
| 2,172,282 | 9/1939 | Hopp . |
| 2,592,386 | 4/1952 | Breakey . |
| 2,719,688 | 10/1955 | Seifert . |
| 2,815,594 | 12/1957 | Heselov . |
| 2,847,776 | 8/1958 | Robertson . |
| 2,849,202 | 8/1958 | McCombs . |
| 3,164,354 | 1/1965 | Murdock . |
| 3,171,179 | 3/1965 | Lee . |
| 3,256,594 | 6/1966 | Howard et al. . |
| 3,287,840 | 11/1966 | Keats . |
| 3,310,901 | 3/1967 | Sarkisian . |
| 3,384,348 | 5/1968 | Wicker . |
| 3,458,945 | 8/1969 | Edwards . |
| 3,521,390 | 7/1970 | Carlson . |
| 3,526,200 | 9/1970 | Doyle . |
| 3,535,807 | 10/1970 | Baldwin . |
| 3,620,496 | 11/1971 | Bolt . |
| 3,646,696 | 3/1972 | Sarkisian . |
| 3,662,482 | 5/1972 | Sarkisian . |
| 3,683,527 | 8/1972 | Gilman . |
| 3,899,843 | 8/1975 | Doyle et al. . |
| 3,910,614 | 10/1975 | Coe . |
| 4,033,536 | 7/1977 | Hillstrom . |
| 4,265,040 | 5/1981 | Sarkisian . |
| 4,288,053 | 9/1981 | Sarkisian . |
| 4,368,586 | 1/1983 | Forzelias . |
| 4,433,935 | 2/1984 | Main et al. . |

FOREIGN PATENT DOCUMENTS

| | | |
|---|---|---|
| 0078520 | 5/1983 | European Pat. Off. . |
| 1269369 | 5/1968 | Fed. Rep. of Germany . |
| 1952505 | 4/1971 | Fed. Rep. of Germany . |
| 1952525 | 4/1971 | Fed. Rep. of Germany . |
| 2163037 | 6/1973 | Fed. Rep. of Germany . |
| 768730 | 2/1934 | France . |
| 1289175 | 5/1961 | France . |

(List continued on next page.)

*Primary Examiner*—J. Franklin Foss
*Assistant Examiner*—David L. Talbott
*Attorney, Agent, or Firm*—Harness, Dickey & Pierce

[57] ABSTRACT

An improved warning sign and sign stand assembly is disclosed and includes apparatus for attaching and retaining the sign to a stand member of the assembly. The various embodiments of the assembly also include various mechanisms for permitting the sign panel to pivot or swing under side-directed loads in order to allow a resilient portion of the stand base to deflect generally along a predetermined plane, thereby substantially preventing the sign and stand assembly from tipping over. The various embodiments are applicable in sign and sign stand assemblies equipped with provisions for selectively collapsing the entire assemblies into compact and conveniently stored configurations, as well as being applicable in assemblies not so equipped.

72 Claims, 72 Drawing Figures

FOREIGN PATENT DOCUMENTS 1286852 1/1962 France .
72532 9/1947 Norway .
323967 1/1930 United Kingdom .
790068 2/1958 United Kingdom .
865044 4/1961 United Kingdom .
1117283 6/1968 United Kingdom .
1133297 11/1968 United Kingdom .
1267932 3/1972 United Kingdom .
1299642 12/1972 United Kingdom .
1311582 3/1973 United Kingdom .
1404624 9/1975 United Kingdom .
2023694A 1/1980 United Kingdom .
2056738A 3/1981 United Kingdom .
1601142 10/1981 United Kingdom .

FIG. 4.
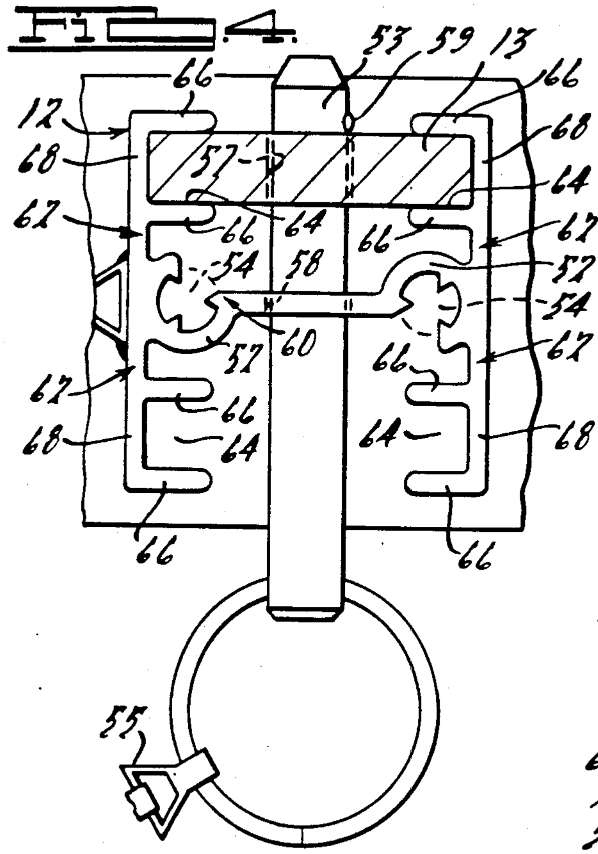
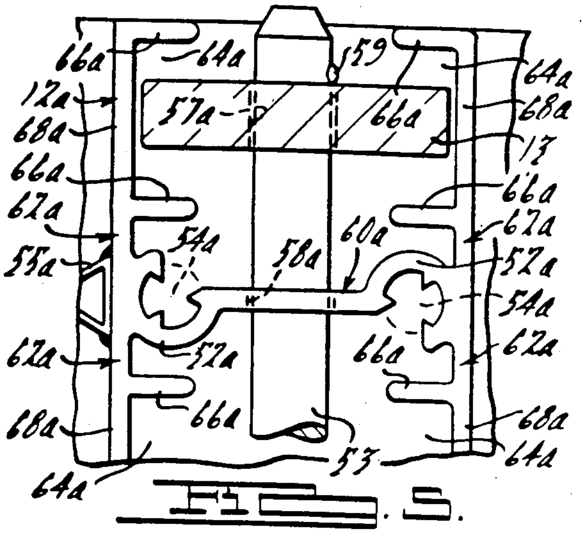
FIG. 5.
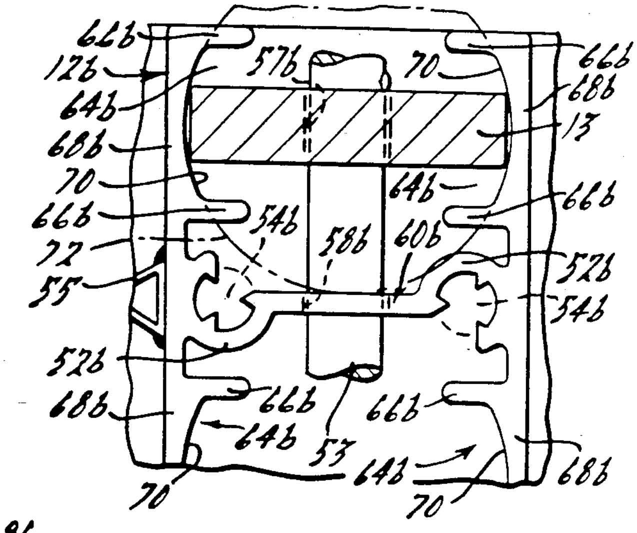
FIG. 6.
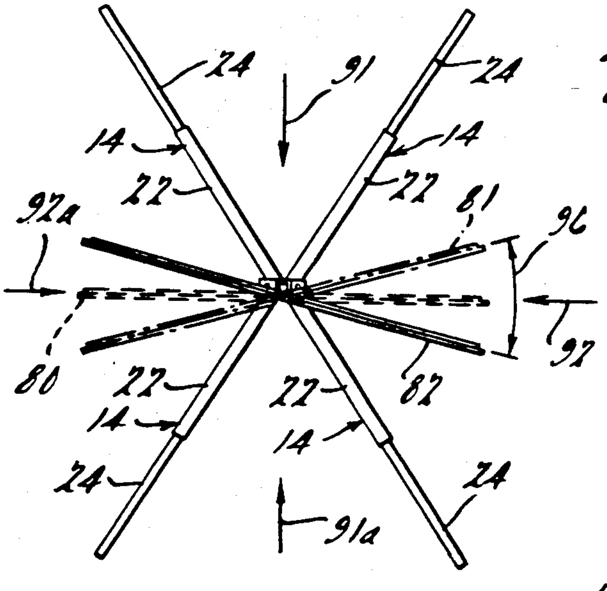
FIG. 7.
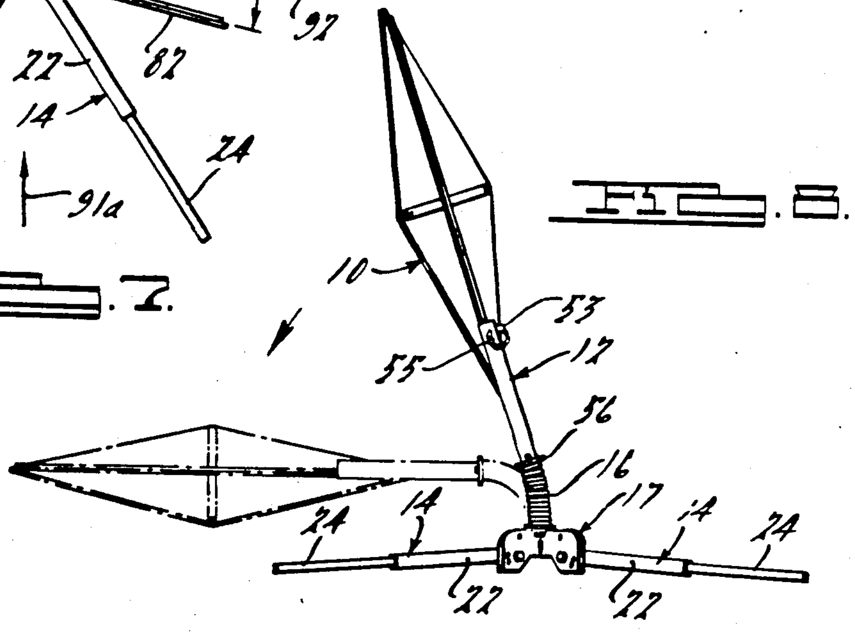
FIG. 8.

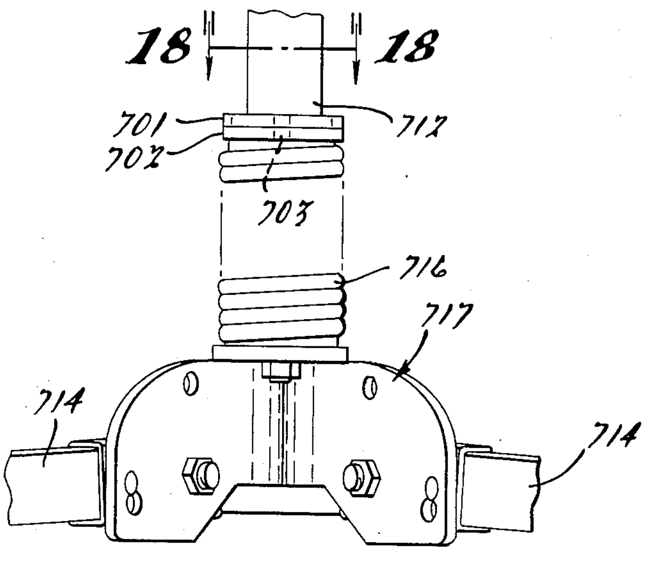
FIG. 17.
FIG. 18.
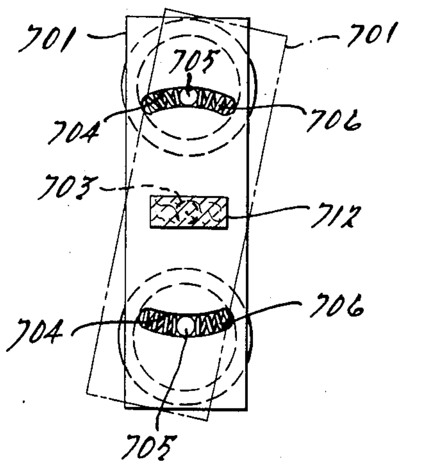
FIG. 19.
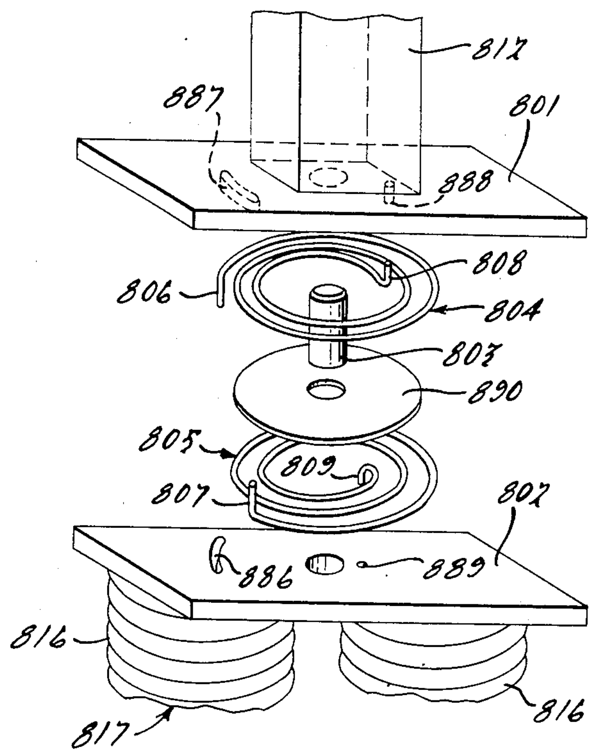
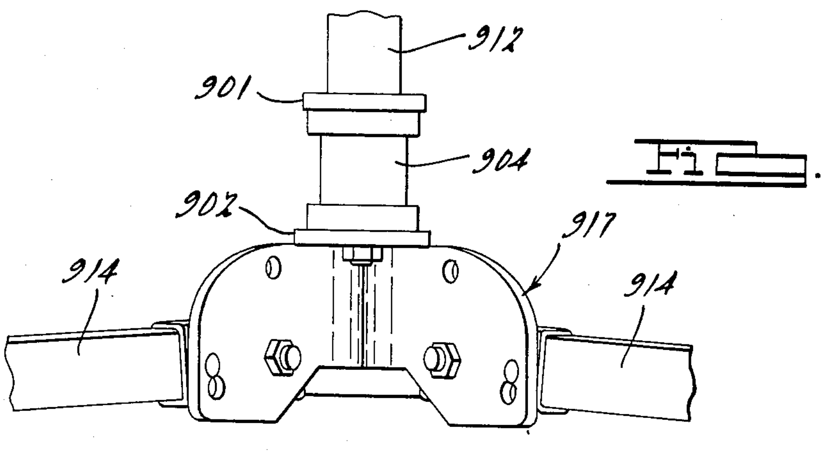
FIG. 20.

SIGN AND SIGN STAND

BACKGROUND AND SUMMARY OF THE INVENTION

This is a continuation-in-part of a copending application entitled COMPACT SIGN AND STAND, Ser. No. 442,418, filed Nov. 17, 1982, U.S. Pat. No. 4,548,379, and of a copending application entitled COMPACT SIGN AND STAND, Ser. No. 751,561, filed July 3, 1985, U.S. Pat. No. 4,593,879, which was a divisional application of the aforementioned application, Ser. No. 442,418, filed Nov. 17, 1982, U.S. Pat. No. 4,548,379, and of a copending application entitled IMPROVED DEFLECTABLE SIGN AND STAND, Ser. No. 719,623, filed Apr. 2, 1985, U.S. Pat. No. 4,569,499, which was a divisional application of a then-copending application Ser. No. 442,378, filed Nov. 17, 1982 (now abandoned), all of said applications being assigned to the same assignee as the invention herein, and all of which are hereby incorporated by reference herein.

The present invention relates to signs and sign stand devices for displaying warnings or other pertinent information, particularly in emergency situations. The invention more specifically relates to such signs and sign stand devices that are relatively stable in the face of winds or other forces exerted thereon from various directions. In a preferred form of the invention, the sign and sign stand assemblies are light-weight and may be folded or retracted into a compact structure for transportation or storage.

Compact, light-weight, easily portable and easily assemblable warning devices are a necessity for emergency use. At accident scenes, for example, police and other emergency vehicles need to provide a warning to other traffic approaching the accident, slow that traffic down, and direct it safely around the accident site. The warning devices should be small enough to fit easily in the emergency vehicle without taking up too much space and yet be large enough in use to be seen easily by other motorists. It is also imperative that the warning devices be usable at all times regardless of weather conditions. For obvious safety reasons, the warning devices should not blow over or slide to undesired locations (such as into traffic) in high winds The ability of the emergency warning device to be sufficiently large in use to be readily visible to oncoming motorists is an especially important consideration. Vehicles arriving at or passing by an accident or emergency site create an extremely dangerous hazard to emergency and accident personnel at the scene, as well as to the emergency vehicles parked nearby. As to the latter point, a large number of police vehicles are struck and damaged each year at accident sites by approaching cars and other vehicles which were not adequately warned about the accident ahead of them.

Numerous sign stands are known today which are used for supporting various signs for providing messages, warnings, advertisements, or other pertinent information to the public, particularly along construction sites or at business establishments. These signs are typically positioned on sign standards that are either anchored in the ground, held in place by sandbags or other heavy objects, or spring-mounted on bases which allow them to bend or deflect, without tipping over, under high wind forces. Spring-mounted sign stands which can be used for this purpose are shown in U. S.

Pat. Nos. 3,646,696; 3,662,482; 4,033,536; 4,265,040; 4,288,053; and 4,544,125; all of which are hereby incorporated by reference herein, as well as in the above-mentioned copending applications, and in two other copending patent applications, Ser. No. 497,815, filed May 25, 1983, U.S. Pat. No. 4,572,473, and Ser. No. 751,561, filed July 3, 1985, U.S. Pat. No. 4,593,879, said copending applications being assigned to the same assignee as the invention herein and being hereby incorporated by reference herein. Some of such spring-mounted sign stands, although they are unanchored, transportable and capable of use regardless of weather conditions, are relatively large in size and would take up too much space in emergency vehicles. Also, some known sign stands have sign mounting mechanisms which are not necessarily designed for the immedaite and simple mounting needed in emergency-type situations.

Frequently, the signs used at construction sites are made of metal or wood and are bulky and heavy. As a result, such signs are not well-suited for compact storage and transportation, such as in a police or other emergency vehicle. In order to provide a lighter and more easily transportable display, signs have been developed which are made out of a heavy-duty flexible material, such as reinforced cloth, vinyl, fiberglass or plastic. Such signs are lighter and easier to handle than the prior metal or wood signs and are also frequently adapted to be rolled-up or folded-up for ease of transportation and storage. These roll-up signs typically have one or more relatively rigid cross-braces, or other such sign-supporting members, to hold them in their fully extended configurations, with brackets or other mounting or attaching means on the sign stands for holding the signs in place. Many of the brackets presently in use for mounting or attaching such signs to the sign stands, however, are often difficult and time-consuming to operate, and typically are relatively heavy and bulky, thereby making them inconvenient for use with emergency vehicles. For emergency use, it is often necessary that the warning devices be adapted to be set up and made operational with as little difficulty and as quickly as possible.

One of the primary objects of the present invention is to provide a sign and sign stand assembly that is relatively stable in the face of winds or other forces directed thereon from various directions. It is another of the objects of the present invention to provide an improved light-weight, foldable and compact sign stand assembly for holding and securing signs thereto, thereby facilitating the convenient storage and transportation of the sign and stand components. It is a further object to provide a sign stand assembly that has the particular capability of quick and easy mounting or attachment of a roll-up or other flexible-type sign on the frame or stand member of the sign stand.

In accordance with the invention, a sign stand for a sign having a sign-supporting member, cross-brace, or other sign mounting member thereon generally includes a base, an upstanding stand or frame member, means for connecting the stand member to the base, and means for attaching the sign's mounting or supporting member to the stand member. The stand base preferably includes one or a plurality of telescoping legs or other ground-engaging means that may be selectively retracted into a shortened configuration or extended into an elongated configuration. The legs are also pivotally attached to the stand base assembly so that they may be folded upwardly to a position generally adjacent and generally parallel to the stand member for transportation or storage or folded downwardly to a ground-engaging position generally transverse and outwardly-extending relative to the stand member. Preferably, the stand member and base, when combined, are approximately the same length as the shortened legs so that when retracted and folded upwardly, the legs form a compact package with the stand member and base for ease and convenience of storage.

The stand member preferably includes means for being resiliently deflected relative to the base assembly, generally along a predetermined plane in response to wind or other first predetermined forces which are generally directed transverse to the sign or stand assembly. The sign stand, or the sign and stand assembly, in the preferred embodiment is adapted to permit the sign to pivot or swing about a generally vertical axis in response to second predetermined forces exerted in directions generally transverse to that of the first predetermined forces. Such pivotal or swinging movement of the sign results in a vector force component on the sign generally aligned with the first predetermined forces and thus allows the stand member to more easily pivotally deflect along the above-mentioned predetermined plane, thereby better insuring against tipping over of the sign stand in the face of the second, generally side-directed, predetermined forces.

Other objects, features and advantages of the present invention will become apparent from the following description and claims taken in conjunction with the accompanying drawings.

BRIEF DESCRIPTION OF THE DRAWINGS

FIG. 4 is a cross-sectional view taken along the plane of section line 4—4 of FIG. 1.

FIG. 5 is a cross-sectional view similar to that of FIG. 4, but illustrating another embodiment of the present invention.

FIG. 6 is a cross-sectional view similar to that of FIG. 4, but illustrating still another embodiment of the present invention.

FIG. 7 is a top view of the sign and stand assembly of the present invention, illustrating the lateral pivotal or swinging movement of the sign.

FIG. 8 is a side view of the sign and stand assembly of the present invention, illustrating the frame member in a partially downwardly-deflected position.

FIG. 17 is a partial elevational view of a further embodiment of the invention, illustrating a pivotal interconnection between a sign stand member and a sign stand base assembly.

FIG. 18 is a cross-sectional view, taken generally along line 18—18 of FIG. 17, illustrating the pivotal relationship between the stand member and base assembly.

FIG. 19 is a partial exploded perspective view of still another embodiment of the invention, illustrating another pivotal interconnection between a sign stand member and a sign stand base assembly.

FIG. 20 is a partial elevational view of a further embodiment of the invention, having a resilient member interconnecting a sign stand member and sign stand base assembly, wherein the resilient member is both bendably and torsionally deflectable.

DETAILED DESCRIPTION OF THE PREFERRED EMBODIMENTS

Figure 1:
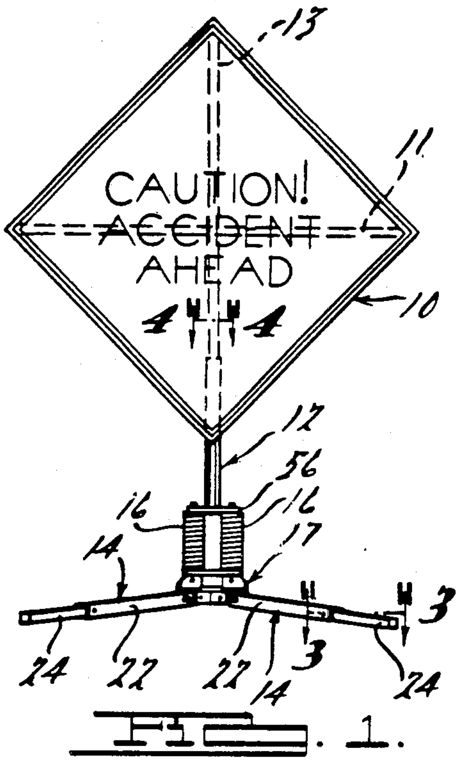
FIG. 1 is a front view of a warning sign and stand.

The drawings show merely exemplary embodiments of the preferred invention for purposes of illustration only. One skilled in the art will readily recognize that the principles of the invention are well-adapted for application to display devices other than sign and stand assemblies as well as to sign and stand assemblies other than those shown in the drawings.

FIG. 1 illustrates the invention in use near an accident scene for providing a warning to on-coming motorists. A warning sign 10 is mounted or attached to a relatively short upright sign frame or stand member 12, and the stand member 12 is supported on the ground by at least one or a plurality of ground-engaging legs 14. A pair of coil springs 16, or other resilient biasing means, interconnect the stand member 12 with a base assembly 17 and allow the sign 10 and stand member 12 to deflect downwardly when subjected to wind forces and then to return to their normal upright positions shown in FIG. 1. Spring-mounted sign stands which function as described above are disclosed in the above-mentioned United States Patents and copending applications. It should be understood, of course, that the various sign attachment means described below may also be used with other types of sign stands or stand frame members, whether permanently anchored or portable, whether spring-mounted or rigidly mounted, and whether supporting sign structures in vertically upright, generally horizontal, or other orientations.

Figure 2:
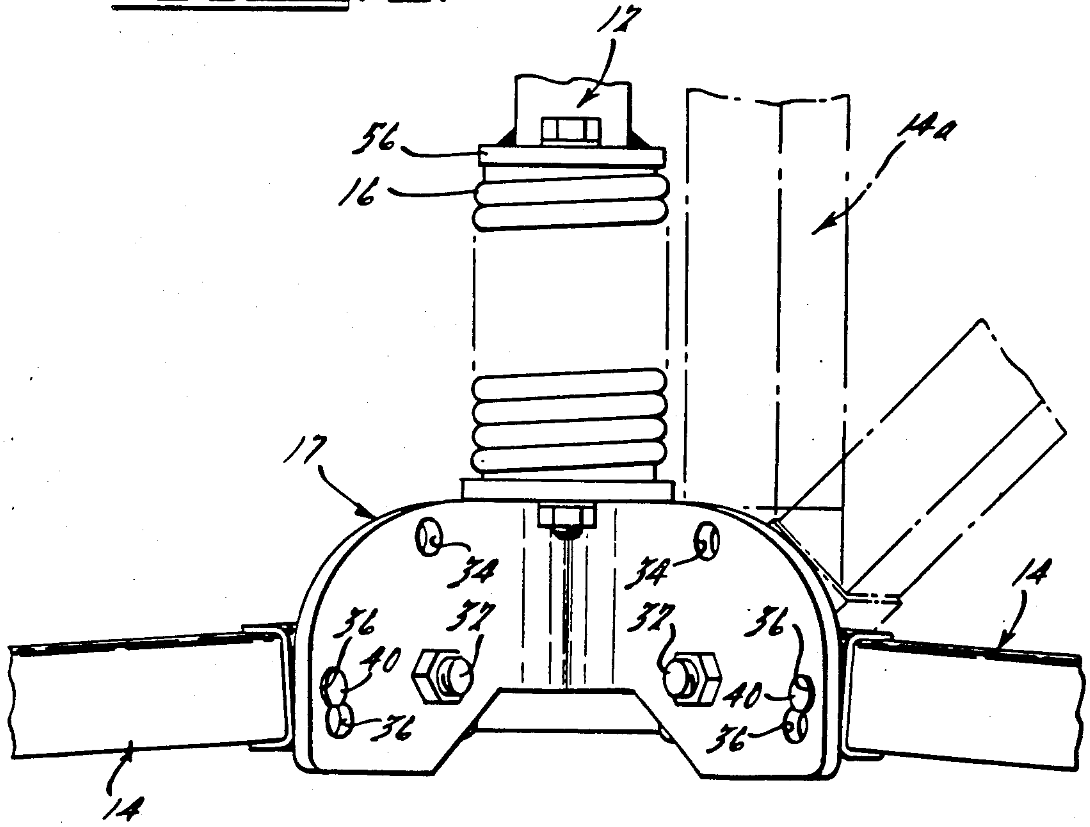
FIG. 2 is an enlarged side view of the base assembly portion of the sign and stand assembly shown in FIG. 1.

The ground-engaging legs 14 are preferably telescopic and include two sections, a smaller slidable section 24 slidably received within a larger sleeve-type outer section 22. The slidable section 24 is adapted to slidably extend and retract inside the sleeve-type section 22 so that the legs 14 may be extended to support the sign and stand assembly or may be retracted to approximatley one-half their fully-extended length for ease and convenience of transportation and storage. Furthermore, as illustrated in FIG. 2, the legs 14 are pivotally attached to a base member 30 of the base assembly 17 by means of a pivot pin 32 extending therethrough. Thus, the legs 14 may be folded downwardly to a ground-engaging position generally perpendicular, or at least transverse, to the stand member 12 or upwardly to a folded position, indicated by reference numeral 14a, wherein the legs are generally adjacent, and preferably generally parallel to, the stand member 12. A spring-loaded locking pin 40 resiliently attached to the inner ends of the legs 14 may be inserted into upper apertures 34 on the base member 30 to retain the legs in their upwardly-folded position. Similarly, the locking pin 40 may be inserted in the lower apertures 36 in the base member 32 to retain the legs 14 in their downwardly-folded, outwardly-extending position. Preferably, the stand member 12, the springs 16, and the base 17 should have a combined overall length approximately equal to the legnth of the legs 14 when they are retracted inwardly and folded upwardly adjacent the stand member 12, thereby facilitating ease and convenience of storage.

Figure 3:
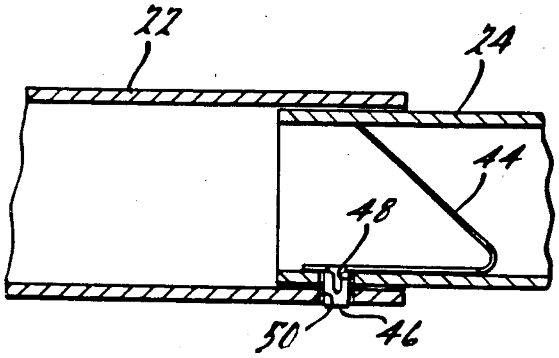
FIG. 3 is a cross-sectional view taken along the plane of section line 3—3 of FIG. 1.

As is shown in FIG. 3, the telescoping sections 22 and 24 of the legs 14 include detent means or other means for releasably holding the legs in their outwardly or fully extended positions. Such detent means may also comprise any of a number of mechanisms well-known to those skilled in the art. An example of such a mechanism is illustrated by the preferred arrangement shown in FIG. 3, wherein a bent and biased spring detent member 44 is resiliently inserted inside each of the leg sections 24. The detent member 44 has a protrusion 46 which is adapted to resiliently protrude through aperture 48 in the side wall of leg section 24 and to seat in a corresponding aperture 50 in the side wall of the leg section 22. At rest, that is when the slidable leg section 24 is in a fully retracted position inside the sleeve leg section 22, the outwardly-biased protrusion 46 rests against the inside surface of the leg section 22. When the leg section 24 is slidably extended from the leg section 22, the protrusion 46 slides in contact with such inner surface of legs section 22 until it mates with and protrudes partially into the aperture 50 adjacent the outer end of leg section 22. In this manner, the legs 14 can be "locked" in their fully-extended positions. As is evident from this description, the legs can be telescoped inwardly to form a compact package for storage and when needed can be quickly and easily extended to their full lengths for convenient set up and use of the sign stand.

The sign 10, which is an example of the various types of signs employable with the present invention, includes a large flexible panel with a warning message or symbol on one side and a pair of sign-supporting members or cross-braces 11 and 13 pivotally attached to one another on the other side. The cross-braces 11 and 13 are made of a fiberglass or similar material, are relatively rigid in order to brace and support the flexible sign panel in its fully extended position, and yet are sufficiently flexible to be twisted to allow lateral movement of the sign as discussed hereinafter. As shown in FIG. 1, the cross brace 11 is situated in a horizontal position when the sign is mounted on the stand member 12, while the other cross-brace 13 is vertically situated and retained by the stand member 12 as described below. Any of several attaching means known in the art may be used to retain the corners of the sign at ends of the cross-braces or sign-supporting members 11 and 13 in order to erect the sign to its display configuration. When the sign 10 is removed from the stand member 12 and is to be taken down, at least two of the corners of the flexible sign panel material are detachable from the ends of their corresponding cross-braces, and the cross-braces are pivotable to a generally parallel or side-by-side relationship. The flexible sign panel 10, which remains attached to one of the cross-braces, may then be folded or rolled up around the collapsed cross-braces for compact, convenient storage.

As is illustrated in FIGS. 4 through 6, the exemplary stand member 12 is preferably an extruded member having a predetermined cross section. The stand member 12 may be composed of any conventional material that is sturdy enough to be used for the purpose described herein, but is preferably composed of a metal, such as light-weight extruded aluminum, for example. Stand members made from such extruded aluminum material have provided very satisfactory performance.

The cross-sectional shape of the exemplary stand member 12, as shown in FIG. 4, includes a central support member 60 and a pair of symmetrical flanges 62 protruding in opposite directions on each end of the central support member 60. The outermost ends of the flange members 62 each include a generally U-shaped channel 64. The channels 64 are identical, but symmetrically opposite, and are each formed by a pair of generally parallel channel legs 66 interconnected by a channel base 68. Preferably, in the embodiment shown in FIG. 4, the width of the space between the corresponding channel legs 66 is such that the vertical sign-supporting member or cross-brace 13 may be slidably and interferingly inserted into the pair of channels 64 on either of the opposite sides of the stand member 12 in order to be frictionally attached and retained therein. Such a symmetrically opposite sign attachment configuration allows the warning sign 10 to be very quickly erected and attached to the stand member 12 merely by frictionally inserting the vertical cross-brace 13 within the pair of channels 64 on either of the identical sides of the stand member 12. Therefore, no matter which of the opposite sides of the frame is oriented toward on-coming traffic when the stand is set-up, the user may quickly erect and display the warning sign without having to reorient the sign stand assembly. Of course, it is also possible, if desired, to provide a stand member 12 with just one pair of channels 64 on only one side of the stand member 12 in accordance with the present invention.

Referring to both FIGS. 1 and 4, it should be noted that only a relatively short portion of the lower end of the vertical cross-brace 13 is inserted into, and frictionally engaged by, the stand member 12. Thus enough of the cross-brace 13 is engaged by the stand member 12 to securely mount the sign 10 thereon, but a relatively large vertical portion of the cross-brace 13 is left unsecured by the stand member 12. Such unsecured portion of the cross-brace or supporting member 13 is sufficienlty long that it may resiliently and torsionally twist under the influence of side-directed wind loads as is explained more fully later in this description.

Because of the relative short length of the supporting member 13 that is frictionally secured to the stand member 12, a hitch pin 53, or other retaining member, may optionally be attached to the stand member 12 by a chain 55 for insertion through apertures 57 and 58 in the cross-brace 13 and the stand member 12, respectively. Although use of such a hitch pin may not be necessary in most instances to insure retention of the cross-brace in the stand member channels, it may be deemed desirable or necessary in particular applications of the invention. If included on stand member 12, however, the hitch pin 53 preferably includes a spring-loaded detent means 59 at its free end for substantially preventing the hitch pin from vibrating loose or otherwise slipping or working free from its engagement with the cross-brace 13 and the stand member 12. The hitch pin and its related apparatus are described in more detail below in connection with the discussion of FIG. 5.

Preferably, the stand member 12 also includes a pair of base attachment receptacles 52 on at least one side of the central support member 60. The base attachment receptacles 52 are preferably extruded integrally with the stand member 12 and are adapted to receive fasteners 54 extending upwardly through an upper plate 56 for securing the stand member 12 to the coil springs 16. The fasteners 54 are preferably self-tapping screws that threadably and frictionally engage the sides of the base attachment receptacles 52 and are long enough to adequately support the stand member 12.

The coil springs 16 on the stand member 12 provide a resilient connection between the frame or stand member and the base assembly 17 such that the stand member 12 is resiliently deflectable generally along a predetermined plane, which is generally perpendicular to the plane of the sign 10 when the sign is in its normal orientation 80 as shown in FIG. 7. In use during high wind forces, the spring mounted sign stands in accordance with the above-mentioned patents and copending applications can deflect to a point where the sign is generally parallel to the ground. Regardless of the amount of deflection, the sign resiliently returns to its upright position when the wind forces subside.

In most cases during use, the deflection of the sign occurs in response to wind forces that are exerted on the sign in a direction generally transverse to the sign, such as those illustrated by reference numerals 91 or 91*a* in FIG. 7, for example. It should be understood, however, that such transversely-directed wind forces need not be exerted in a direction perpendicular to the sign when in its normal sign orientation 80 in order to cause such deflection of the coil spring 16. It is sufficient merely that such transversely-directed forces have enough of a force vector component in a direction perpendicular to the normal mean or effective sign orientation 80 such that the coil springs 16 may be caused to deflect.

In order to insure that the sign and stand assembly will remain stable in side-wind load situations, such as in response to second preedetermined forces 92 or 92*a* exerted on the sign in a direction generally parallel to the normal sign orientation as shown in FIG. 7, the stand member 12 shown in FIG. 4, and the alternate stand members 12*a* and 12*b*, shown in FIGS. 5 and 6, and discussed below, include means for allowing the sign to pivot or swing about a generally vertical axis. Such capability allows the pivoted sign to assume sign orientations such as those illustrated by reference numerals 81 and 82 in FIG. 7, which in turn allow the stand to pviot and deflect along the above-mentioned predetermined plane as is more fully explained below.

In the embodiment of the invention illustrated in FIG. 4, the capability of allowing the sign panel to pivot or swing is provided by the above-discussed unsecured portion of the cross-brace or sign-supporting member 13. Such unsecured portion is sufficiently long and sufficiently flexible to torsionally twist about a generally vertical axis in response to the side-directed second wind forces 92 or 92*a*, for example. Such torsional twisting thus permits the sign to pivot or swing as shown in FIG. 7. When the sign pivots or swings laterally about said generally vertical axis to a transverse orientation relative to such side-directed or second forces, such second forces, such as 92 or 92*a*, have a force vector component exerted in a sufficiently transverse direction against the sign such that the coil springs 16 may resiliently deflect the stand member 12 along the above-described predetermined plane, as shown in FIG. 8. The length and flexibility of the unsecured portion of the sign-supporting member 13 should be sufficient to allow enough torsional twisting of the cross-brace to permit the sign to pivot or swing far enough to cause the coil springs 16 to deflect along such predetermined plane before the sign and stand assembly can tip over under the load of the second wind forces.

The exact range of pivotal or swinging motion of the sign 10 depends upon many factors such as sign size, height and weight and coil spring constants, for example. However, a range of pivotal movement through a total arc 96 in FIG. 7 of approximately 10–35 degrees, and most preferably approximately 15 degrees swing to either side of the normal sign orientation 80, has been found to provide satisfactory results. Either smaller or larger ranges of such pivotal sign movement may also be found to be sufficient or necessary in order to provide satisfactory results, depending upon the particular physical constraints present and the particular application of the principles of the invention. It should be realized, however, that such pivotal or swinging movement should not be significantly greater than that necessary to allow deflection of the stand member 12 along the above-mentioned predetermined plane in order to prevent the sign from becoming oriented so far askew to oncoming traffic that it cannot be read and observed by such traffic.

Referring to FIG. 5, an alternate preferred embodiment of the present invention includes a stand member or frame 12*a* generally similar to the stand member 12 shown in FIG. 4 with the exceptions described below. As an alternative for the torsional twisting of the unsecured portion of the cross-brace or sign-supporting member 13. It is also possible to allow the cross-brace to pivot or swing freely inside the channels 64*a*, i.e. without any frictional engagement. In this embodiment, as shown in Figure 5, the channels 64*a* are made sufficiently large to allow the vertical cross-brace 13 to slide rather loosely and easily into the channels virtually without contacting the leg portions 66*a* in order to permit sufficient pivoting or swinging of the cross-brace upon application of side-directed second forces such as 92 and 92*a*, for example. In order to prevent the cross-brace 13 from slipping out of the channel when the stand member 12 is deflected (as shown in FIG. 8), the hitch pin 53 is inserted through the aperture 58*a* in the cross-brace 13 and through the corresponding aperture 57*a* in the stand member 12*a*. Similar to the embodiment shown in FIG. 4 above, two channels 64*a* are preferably provided on opposite sides of the stand member 12*a* so that the cross-brace 13 can be inserted in the properly-oriented side (facing the traffic) once the stand is set-up in place.

As discussed above, the hitch pin 53 has a spring-loaded detent means 59, which comprises a spring-loaded ball or sphere resiliently attached to the free end of the hitch pin. This detent means prevents the hitch pin from falling or slipping out of the apertures 58*a* and 57*a* after it is inserted in place. Thus, in order to insert and remove the hitch pin 53, a force must be applied in the pin's axial direction. Chain 55 is attached to the other end of the hitch pin and is in turn attached to the stand member 12*a* in order to prevent the hitch pin from being lost or misplaced.

Referring to FIG. 6, still another alternate preferred embodiment of the invention includes a stand member or frame 12*b*. In this embodiment, the means for allowing lateral pviotal or swing sign movement is provided by channels 64*b* formed by the channel legs 66*b* and the interconnecting channel bases 68*b*, which have generally arcuate frame-engaging surfaces 70. The spaces between the channel legs 66*b* are sufficiently wider than the thickness of the cross-brace 13 to allow the cross-brace to pivot or swing, as discussed above, about a generally vertical axis as illustrated in FIGS. 7 and 8. As is shown in FIG. 6, however, the corner edges of the sign-supporting member or cross-brace 13 frictionally engage the arcuate surface 70 of the channels 64*b* to frictionally retain the cross-brace 13 and thus the sign 10 in an attached relationship with the stand member 12*a*. Thus, the sign 10 may be attached to the stand member 12*b* merely by slidably and frictionally inserting the vertical cross-brace 13 into the channels 64*b* on either of the opposite sides of the stand member 12*b* such that the cross-brace 13 is frictionally retained therein. Such frictional engagement of the cross-brace 13 and the channel 64*b* is maintained even when the sign 10 pivots laterally about the above-mentioned vertical axis. The hitch pin 53, with its detent means 59 and chain 55 as discussed above, may also be employed in FIG. 6 in connection with the apertures 57*b* and 58*b*, if deemed desirable or advantageous in order to assure retention of the sign.

When this sign pivots or swings about said generally vertical axis to a transverse orientation relative to side-directed winds, as discussed above in connection with the embodiments of FIGS. 5 and 6, the second wind forces, such as 92 or 92*a*, have a force vector component exerted in a sufficiently transverse direction against the sign such that the coil springs 16 may resiliently deflect the stand members 12*a* and 12*b* along the above-described predetermined plane, as shown in FIG. 8. The width of the channels 64*a* and 64*b*, the distance between the channel bases 68*a* and 68*b*, and the spring constants of the coil springs 16 are selected such that sufficient pivotal or swinging movement of the sign occurs to cause or allow the resultant deflection of the stand member to occur before the sign and stand assembly can tip over under the load of the second wind forces.

As is discussed above, the exact range of pivotal movement of the sign depends upon several factors such as sign size and weight and coil spring constants, for example. However a range of pivotal sign movement through a total arc 96 (shown in FIG. 7) of approximately 10-35 degrees, and preferably approximately 15 degrees on either side of the normal sign orientation 80, has been found to provide satisfactory results. Either smaller or larger ranges of pivotal movement may also be sufficient to cause or allow the desired frame or stand member deflection, depending upon the particular physical conditions present and the particular application of the principles of the invention. It should be noted, however, that the arcuate surfaces 70 in FIG. 6 preferably both fall upon an imaginary circle 72 (shown in FIG. 6) which has a center located generally midway between the arcuate surfaces 70 and generally midway between the channel legs 66*b*. Such a configuration provides for the desired frictional engagement of the sign-supporting member or cross-brace 13 with the arcuate surfaces 70 while still allowing the requisite pivotal movement.

As shown and described above, the present invention provides a sign stand having the capability of simple, quick and easy attachment and removal of signs on the sign stand member. The present invention also provides a sign attachment means that functions to minimize the possibility of the sign and stand assembly tipping over or sliding to undesired locations in high winds, no matter in which direction the forces of such winds are exerted.

the various parts of the sign and stand assembly are preferably made of aluminum, but may also be made of any other light-weight materials that are strong enough to withstand the forces to which such signs are normally exposed in use.

Although the embodiments of the present invention are described as being used for flexible or roll-up signs of diamond shapes, it is apparent that the invention may be employed with a wide variety of signs of different materials, rigid or soft and with signs of widely varying sizes and shapes. With rigid signs, however, a flange or protruding member at least functionally similar to the vertical cross-brace 13 should be provided and should be adapted to be inserted as discussed above within the channels 64, 64*a* or 64*b* on either of the opposite sides of the stand members 12, 12*a* or 12*b*, respectively. In the embodiment of FIG. 4, however, such a flange or protruding member should have sufficient resilience and flexiblity to allow the above-described torsional twisting of its unsecured portion. Also, in order to retain the advantageous compactness and relatively small size of the invention for storage and transportation, such rigid signs could also be collapsible or foldable.

Figure 9:
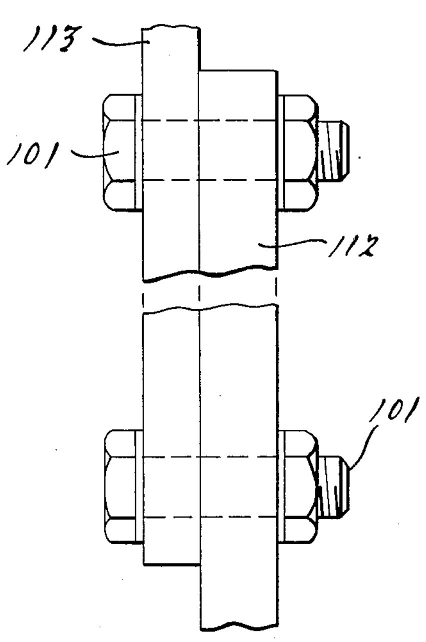
FIG. 9 is a partial side elevational view illustrating another embodiment of the invention with another attachment of a sign-supporting member to a sign stand member.
Figure 10:
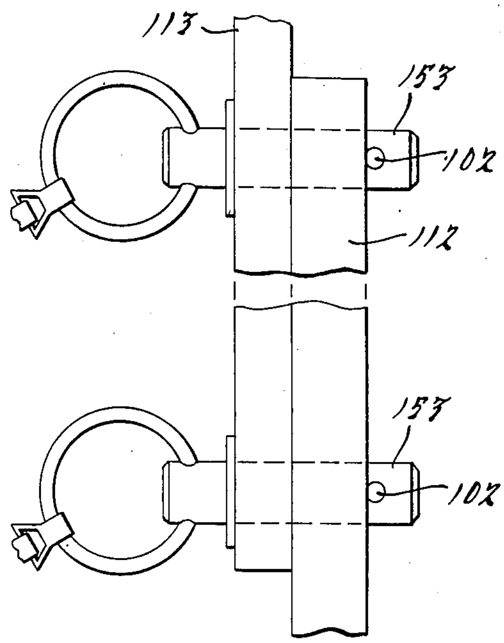
FIG. 10 is a partial side elevational view similar to that of FIG. 9, but illustrating still another attachment of a sign-supporting member to a sign stand member.

FIGS. 9 through 12 illustrate various further optional variations of the present invention illustrated in FIGS. 1 through 8. Such variations employ the same general principles in various other structural configurations to achieve the same general functional objectives as those of the embodiments of FIGS. 1 through 8. As an example, FIGS. 9 and 10 illustrate an attachment of a sign-supporting member 113 to a stand member 112 by way of conventional fasteners, such as the threaded fasteners 101 shown in FIG. 9 or the hitch pins 153 and detent means 102 shown in FIG. 10.

In FIGS. 9 and 10, the fasteners 101, or the hitch pins 153, securely, but preferably removably, attach the sign-supporting member 113 to the stand member 112 in a manner similar to that of the stand member 12 and the sign-supporting member 13 illustrated in FIG. 4. Also, in a manner similar to the embodiment of FIG. 4, the sign-supporting member 113 has a substantial portion of its length that is substantially free of, and unsupported by, the stand member 112. Thus the unsupported portion of the sign-supporting member can resiliently and torsionally twist in response to the above-discussed second predetermined forces, such as the forces 92 and 92*a* of FIG. 7, exerted in directions generally transverse to the above-discussed first predetermined forces 91 and 91*a*, also illustrated in FIG. 7. Such torsional twisting of the sign-supporting member 113 allows the sign to pivot or swing generally relative to the axis of the stand member 112 in response to such second predetermined forces, as discussed above. It should also be noted that the arrangements shown in FIGS. 9 and 10 preferably include more than one of the fasteners 101, or the hitch pins 153, in order to substantially retain the sign-supporting member 113 in a generally upright, or longitudinally-extending, orientation relative to the stand member 112. This is accomplished by substantially preventing the sign-supporting member 113 from pivoting or rotating laterally about an axis that is transverse to that of the stand member 112.

Figure 11:
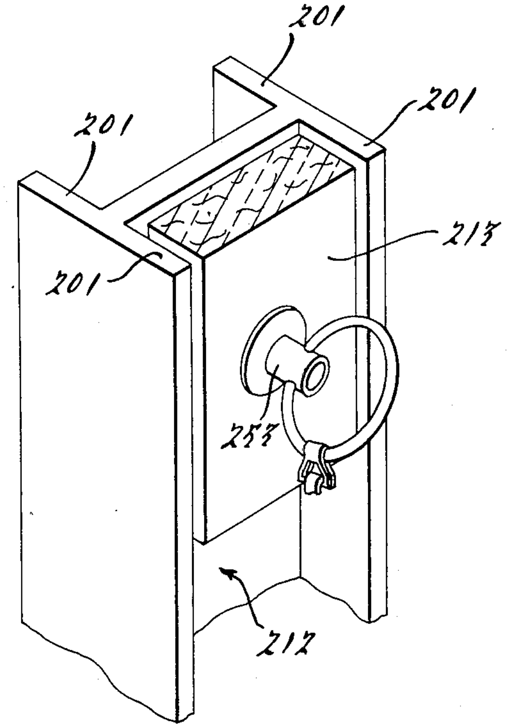
FIG. 11 is a partial perspective view of still another embodiment of the invention with still another attachment of a sign-supporting member to a sign stand member.

In FIG. 11, a stand member 212 is provided with flange portions 201 extending from either or both of its lateral faces. The spacing and sizes of the flange portions 201 are such that a sign-supporting member 213 can be loosely received therebetween. The sign-supporting member 213 is loosely attached to, and retained on, the stand member 212 by way of a fastener, such as the hitch pin 253, which is insertable in a relatively loose fitting relationship into apertures (not shown) extending through the sign-supporting member 213 and the stand member 212. By such an arrangement, the sign-supporting member 213 is loosely allowed to pivot or swing, along with the sign, generally about the axis of the stand member 212 in response to generally side-directed second forces in a manner similar to that discussed above in connection with FIG. 5.

In the variation shown in FIG. 11, the flange portions 201 substantially retain the sign-supporting member 213 (and thus the sign itself) in a generally upright, or longitudinally-extending, orientation relative to the stand member 212 by substantially preventing pivotal or rotational movement about an axis transverse to that of the stand member 212. Thus only one fastener, such as the hitch pin 253, is required in the embodiment of FIG. 11. In this regard, it should be noted that a similar sign-pivoting or sign-swinging result can be achieved by modifying the attachments shown on FIGS. 9 and 10 to provide a relatively loose fit for the fasteners 101, or the hitch pins 153, in order to relatively loosely attach and retain the sign-supporting member 113 to the stand member 112. In such modifications, the provision of more than one of such fasteners or hitch pins substantially retains the sign-supporting member 113 in the above-discussed upright orientation by substantially preventing the above-discussed pivoting or rotating about an axis transverse to that of the stand member 112.

Figure 12:
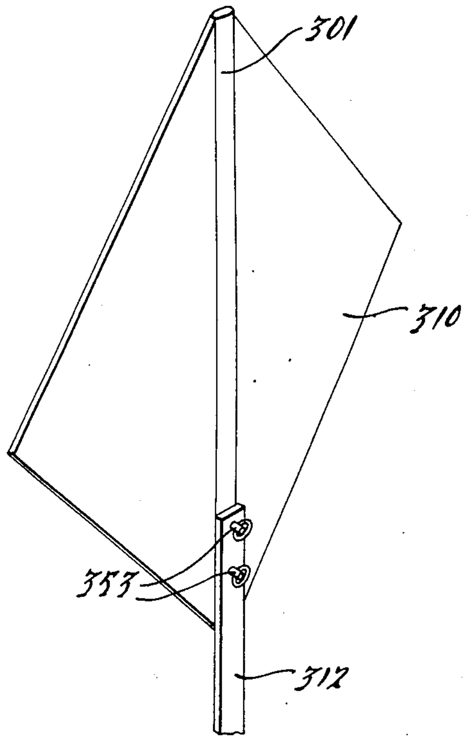
FIG. 12 is a partial perspective view of still another embodiment of the invention wherein a sign is attached directly to a sign stand member, with the sign optionally having a reinforcing member integrally formed therewith.
Figure 13:
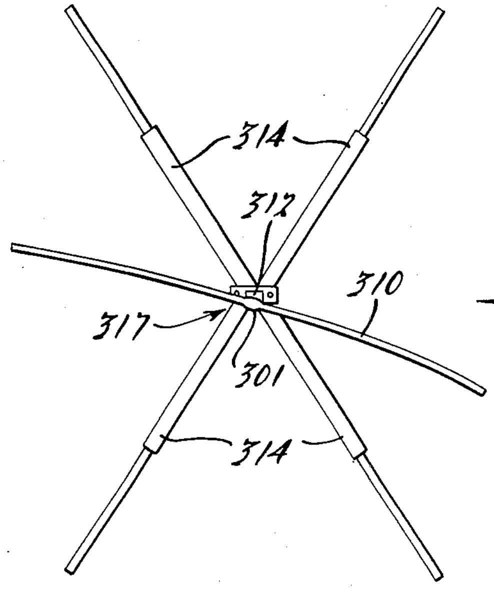
FIG. 13 is a top view of the embodiment of FIG. 12, illustrating the sign flexing in the face of side-directed forces exerted thereon.

In FIGS. 12 and 13, a somewhat flexible and resilient sign 310 is preferably removably attached directly to a stand member 312, by way of hitch pins 353 or other suitable fastening means. Because of its resiliency and flexibility, the sign 310 is capable of deflectably pivoting or swinging in response to the above-discussed generally side-directed second forces, such as the forces 392 shown in FIG. 13. If deemed necessary in such a variational embodiment, a generally vertical reinforcing member 301 can be secured to, or integrally formed with, the sign 310 to substantially prevent the sign 310 from undesirably deflecting downwardly from its desired generally upright orientation, while still allowing the above-discussed pivoting or swinging deflection shown in FIG. 13. In this embodiment, a number of fasteners or hitch pins 353 may also be necessary to retain the sign 310 in its desired upright orientation relative to the stand member 312.

Figure 14:
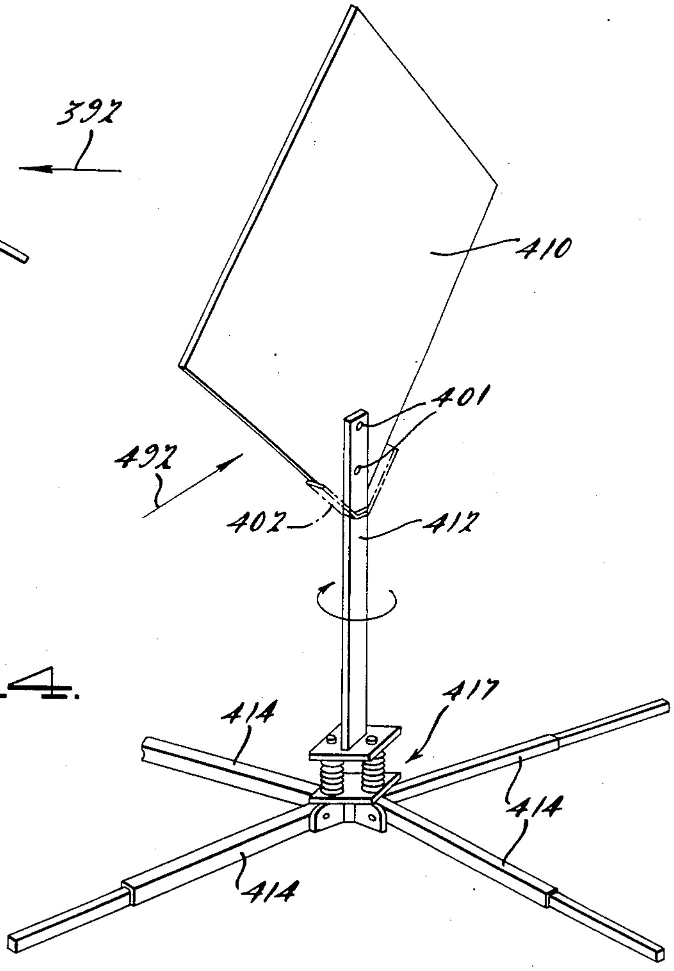
FIG. 14 is a perspective view of a further embodiment of the invention, wherein a sign is attached directly to a torsionally deflectable sign stand member.

In FIG. 14, a sign 410 is also preferably removably attached directly to a stand member 412, and the stand member 412, when substantially unrestrained at one end, is sufficiently flexible and resilient to torsionally twist generally about its own axis and relative to the base assembly 417. Such capability of the stand member 412 to torsionally twist, similar to that of the sign-supporting members 13 and 113 of FIGS. 4 and FIGS. 9 and 10, respectively, allows the sign 410 to pivot or swing about the axis of the stand member 412 in response to the above-discussed generally side-directed forces, such as the force 492 shown in FIG. 14. The sign 410 is retained in a desired upright orientation by a pair of fasteners or retainers 401, or for example by the optional provision of a V-shaped flange 402 secured to the stand member 412, as shown in broken lines in FIG. 14.

Figure 15:
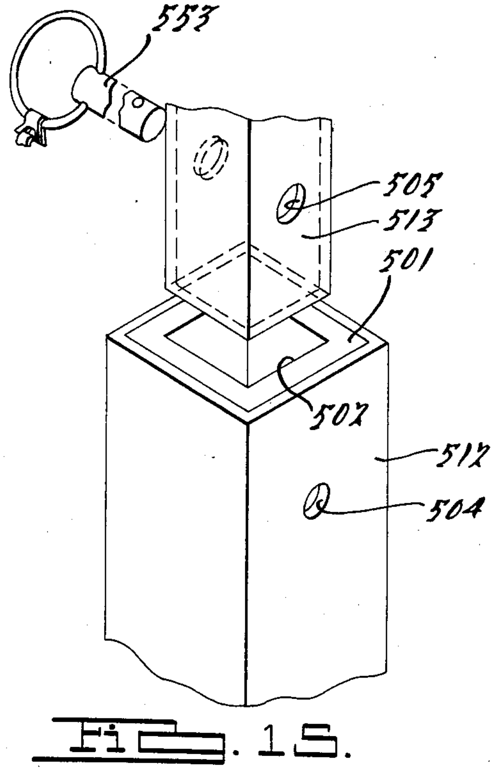
FIG. 15 is a partial perspective view of still another embodiment of the invention, illustrating still another attachment of a sign-supporting member to a sign stand member.
Figure 16:
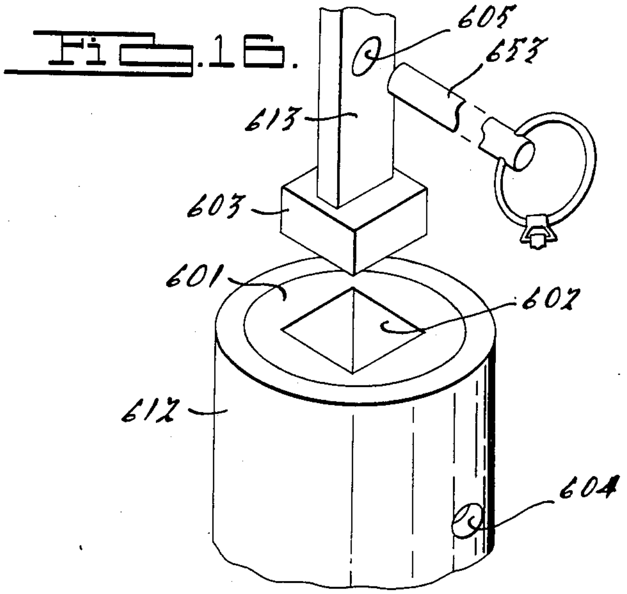
FIG. 16 is a partial perspective view of still another embodiment of the invention, illustrating still another attachment of a sign-supporting member to a sign stand member.

FIGS. 15 and 16 illustrate two other exemplary variations on the present invention where in the sign-pivoting or sign-swinging capability is provided by the mechanism for interconnecting or attaching sign-supporting members 513 or 516 to stand members 512 or 612, respectively. In such variations, a resilient rubber or other elastomeric material is fixedly secured to the respective stand members 512 or 612 to form interconnecting attachment members 501 or 601, respectively. The attachment members 501 and 601 are provided with non-circular openings 502 and 602, respectively, therein for insertably receiving the respective sign-supporting members 513 and 613 in pivotally or rotationally interlocking engagements therewith. In FIG. 15, such interlocking engagement is provided by the size and configuration of the sign-supporting member 513, which has a cross-sectional shape complementary to that of the opening 502. Similarly, in FIG. 16, the more flat sign-supporting member 613 has a foot or base member 603 with a shape complementary to that of the opening 602.

In both FIGS. 15 and 16, the attachment members 501 or 601, respectively, are sufficiently resilient and flexible to allow the respective sign-supporting members 513 or 613 to pivot or twist generally about the axis of their respective stand members 512 or 612. Such capabilities allow the respective signs (not shown) to similarly pivot or swing in response to side-directed second predetermined forces in a manner similar to that discussed above in connection with other embodiments of the invention.

It should be noted, as a further variation on the present invention, that the sign-supporting members 513 or 613 in FIGS. 15 or 16 can also be torsionally flexible and resilient, like the sign-supporting members 12 and 112 discussed above, in order to even further contribute to the sign-pivoting or sign-swinging capabilities of their respective sign and stand assemblies. Similarly, such additional pivoting or swinging capabilities can be achieved by providing a relatively loose fit of the sign-supporting member 513 or the foot member 603 in their respective openings 502 or 602. In any of the variations on the exemplary embodiments shown in FIGS. 15 or 16, hitch pins 553 or 653 can be inserted into corresponding apertures 504 and 505, or 604 and 605, if it is deemed necessary to retain their respective sign-supporting members on their respective stand members.

In FIGS. 17 through 20, the above-discussed sign pivoting or sign-swinging capability is provided by pivot or swivel means interconnecting a sign stand member with a sign stand base assembly. In FIGS. 17 and 18, a pair of preferably plate-like pivot members 701 and 702 are pivotally disposed and interconnected with each other by a pivot pin 703. The pivot members 701 and 702 are secured to a stand member 712 and a base assembly 717, respectively, in order to provide and accommodate the above-discussed sign-pivoting or sign-swinging capability.

The pivot member 701 includes one or more arcuate openings or slots 704, shown in FIG. 18, for slidably receiving a corresponding number of pins 705 extending from the pivot member 702. The interrelationship between the pins 705 and the slots 704 limits the pivoting or swinging motion of the stand member 712 (and its sign) relative to the pivot pin 703 and the pivot member 702. In order to resiliently bias the stand member 712 toward a desired intermediate display position between the limits of its pivotal motion, return springs (or other resilient members) 706 are provided in the slots 704 on opposite sides of the pins 705. Such return springs 706 function to resiliently restore the sign (not shown) to a desired display orientation after its pivoting and swinging in response to the above-discussed second, side-directed forces have subsided. It should be noted that the slots 704 and the return springs 706 can optionally be provided in the pivot member 702, and thus the pins 705 can be provided in the pivot member 701, lieu of the specific construction shown in FIG. 18.

In FIG. 19, another pivotal interconnection is illustrated between a stand member 812 and a base assembly 817 in order to provide the above-discussed sign-pivoting or sign-swinging capability. A pivot member 801 secured to the stand member 812 is pivotally interconnected with a pivot member 802 by way of a pivot pin 803, which is preferably disposed generally along the axis of the stand member 812. A pair of oppositely-wound, generally flat springs 804 and 805 are disposed between the pivot members 801 and 802, respectively. The springs 804 and 805, which can be of the type sometimes referred to as "clock-springs", serve to resiliently bias and return the pivot members 801 and 802 to desired relative positions that correspond to an intermediate desired display orientation of the stand member 812 and the sign (not shown).

In order to perform the above-discussed biasing and return functions, each of the springs 804 and 805 is anchored to opposite ends of its spiral configuration to the pivot members 801 and 802, by way of respective outer anchor pin portions 806 and 807 and respective inner anchor pin portions 808 and 809. Thus, as is illustrated in FIG. 19, the outer anchor pin 806 on the spirng 804 is slidably received in an arcuate slot 886 in the pivot member 802, and the inner anchor pin 808 on the spring 804 is fixedly received in an anchor opening 888 in the pivot member 802. Similarly, but in an opposite arrangement, the outer anchor pin 807 on the spring 805 is slidably received in an arcuate slot 887 in the pivot member 801, and the inner anchor pin 809 on the spring 805 is fixedly received in an anchor opening 889 in the pivot member 802.

Because of the above-described arrangement, when second predetermined, or side-directed, forces cause clockwise relative pivotal movement of the sign, the stand member 812 and the pivot member 801 (as viewed in FIG. 19), the engagement of the outer anchor pin 807 with one end of the arcuate slot 887 causes the spring 805 to resiliently "wind up" to a tightened condition. When the side-directed forces subside so that the spring 805 can overcome the sign-pivoting force, the spring 805 resiliently "unwinds" to a neutral, unloaded condition, thus returning the stand member 812 (and the sign) to a desired display orientation. In order to substantially prevent an undesired and improper "unwinding" loading of the spring 804 during the above operation, its outer anchor pin 806 slidably moves, in a "lost-motion" manner from one end to the other of the arcuate slot 886, without being resiliently deformed or loaded. During counterclockwise sign pivoting movement, the springs 804 and 805 perform in a manner opposite that described above in order to load the spring 804 in a resiliently tightening direction and to substantially avoid the undesired and improper "unwinding" loading of the spring 805. During sig-pivoting motion in either direction, the sliding frictional engagement between the springs 804 and 805 is preferably substantially minimized by a low-friction bearing plate 890 disposed therebetween and retained in place by the pivot pin 803. The bearing plate 890 can be composed of a low-friction synthetic resin or any of several other known anti-friction materials.

In FIG. 20, the resilient biasing spring or springs 16 shown in FIGS. 1 through 8 are replaced by one or more bendable resilient, and preferably elastomeric, members 904. The resilient members 904 are secured to, and serve to interconnect, a pair of pivot members 901 and 902, which are in turn secured to a stand member 912 and to a base assembly 917, respectively. In addition to being resiliently bendable in response to the above-mentioned first predetermined forces, the resilient member 904 is also resiliently deflectable in torsion in order to be capable of resiliently twisting and allowing the above-discussed sign-pivoting or sign-swinging motion in response to the above-discussed second predetermined forces. Thus, in the variation illustrated in FIG. 20, both the sign stand deflecting feature and the sign pivoting feature discussed above are provided and accommodated by way of the interconnecting apparatus between the base assembly 917 and the stand member 912.

It should be emphasized that all of the exemplary variations on the present invention illustrated in the drawings can optionally include the above-discussed features by which one or more legs on the base assembly can be retracted and collapsed, or extended and expanded, in order to facilitate the ease of set-up, transportation and storage of the sign stand assembly or the sign and sign stand assembly. Furthermore, in any of the embodiments described and illustrated herein, the sign can optionally be either removably or permanently mounted and displayed on the sign stand assembly.

The foregoing discussion discloses and describes merely exemplary embodiments of the present invention. One skilled in the art will readily recognize from such discussion that various changes, modifications and variations may be made therein without departing from the spirit and scope of the invention as defined in the following claims.

We claim:

1. A sign and sign stand assembly comprising: a base for supporting said assembly, a generally longitudinally-extending stand member, connecting means for connecting said stand member to said base, a sign-supporting member, attaching means for attaching said sign-supporting member to said stand member, resilient biasing means for normally biasing said stand member into a generally upright position, said resilient biasing means being resiliently yieldable to allow said stand member to deflect in a generally downward direction in response to first predetermined forces exerted on said assembly, a substantial portion of said sign-supporting member being free of said stand member and substantially unsupported thereby in order to allow said sign and at least said substantially unsupported portion of said sign-supporting member to pivotally swing relative to the axis of said stand member in response to second predetermined forces exerted on said assembly in a direction generally transverse to said first predetermined forces.

2. A sign and sign stand assembly according to claim 1, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length apoproximately equal to the length of said leg when in said shortened configuration.

3. A sign and sign stand assembly according to claim 2, wherein said sign-supporting member is removably attached to said stand member.

4. A sign and sign stand assembly according to claim 1, wherein at least said substantially unsupported portion of said sign-supporting member is sufficiently flexible and resilient to torsionally twist in order to allow said sign to pivotally swing relative to the axis of said stand member in response to said second predetermined forces.

5. A sign and sign stand assembly according to claim 1, further comprising at least one retaining member adapted to be inserted through an aperture in said sign-supporting member and through a corresponding aperture in said stand member in order to retain said sign-supporting stand member.

6. A sign and sign stand assembly comprising: a base for supporting said assembly, a generally longitudinally-extending stand member, connecting means for connecting said stand member to said base, a sign-supporting member, attaching means for attaching said sign-supporting member to said stand member, resilient biasing means for normally biasing said stand member into a generally upright position, said resilient biasing means being resiliently yieldable to allow said stand member to deflect in a generally downward direction in response to first predetermined forces exerted on said assembly, said attaching means being adapted for attaching said sign-supporting member to said stand member in a relatively loose relationship therewith for predetermined limited pivotal movement of said sign-supporting member relative to the axis of said sign member in order to allow said sign and at least a portion of said sign-supporting member to pivotally swing relative to the axis of said stand member in response to second predetermined forces exerted on said assembly in a direction generally transverse to said first predetermined forces.

7. A sign and sign stand assembly according to claim 6, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

8. A sign and sign stand assembly according to claim 7, wherein said sign-supporting member is removably attached to said stand member.

9. A sign and sign stand assembly according to claim 6, wherein said stand member includes retaining means for substantially retaining said sign-supporting member in a generally longitudinally-extending orientation thereon when said sign-supporting member is attached thereto.

10. A sign and sign stand assembly according to claim 9, wherein said retaining means includes flange means on said stand member for substantially preventing said sign-supporting member from pivoting about an axis transverse to the axis of said stand member.

11. A sign and sign stand assembly according to claim 6, further comprising at lesat one retaining member adapted to be inserted through an aperture in said sign-supporting member and through a corresponding aperture in said stand member in order to retain said sign-supporting stand member.

12. A sign and sign stand assembly comprising: a base for supporting said assembly, a generally longitudinally-extending stand member, attaching means for attaching said sign to said stand member, resilient biasing means for normally biasing said stand member into a generally upright position, said resilient biasing means being resiliently yieldable to allow said stand member to deflect in a generally downward direction in response to first predetermined forces exerted on said assembly, at least a portion of said sign being sufficiently flexible and resilient to pivotally swing relative to the axis of said stand member in response to second predetermined forces exerted on said assembly in a direction generally transverse to said first predetermined forces.

13. A sign and sign stand assembly according to claim 12, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

14. A sign and sign stand assembly according to claim 13, wherein said sign is removably attached to said stand member.

15. A sign and sign stand assembly according to claim 12, wherein said sign includes reinforcing means for substantially preventing said sign from deflecting relative to said stand member in said generally downward direction in response to said first predetermined forces.

16. A sign and sign stand assembly comprising: a base for supporting said assembly, a generally longitudinally-extending stand member, attaching means for attaching said sign to said stand member, resilient biasing means for normally biasing said stand member into a generally upright position, said resilient biasing means being resiliently yieldable to allow said stand member to deflect in a generally downward direction in response to first predetermined forces exerted on said assembly, said attaching means being adapted for attaching said sign to said stand member in a relatively loose relationship therewith for predetermined limited pivotal movement of said sign relative to the axis of said stand member in order to allow said sign to pivotally swing relative to the axis of said stand member in response to second predetermined forces exerted on said assembly in a direction generally transverse to said first predetermined forces.

17. A sign and sign stand assembly according to claim 16, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

18. A sign and sign stand assembly according to claim 17, wherein said sign is removably attached to said stand member.

19. A sign and sign stand assembly according to claim 16, wherein said stand member includes retaining means for substantially retaining said sign in a generally longitudinally-extending orientation thereon when said is attached thereto.

20. A sign and sign stand assembly according to claim 19, wherein said retaining means includes flange means on said stand member for substantially preventing said sign from pivoting about an axis transverse to the axis of said stand member.

21. A sign and sign stand assembly comprising: a base for supporting said assembly, a generally longitudinally-extending stand member, attaching means for attaching said sign to said stand member, resilient biasing means for normally biasing said stand member into a generally upright position, said resilient biasing means being resiliently yieldable to allow said stand member to deflect in a generally downward direction in response to first predetermined forces exerted on said assembly, at least a portion of said stand member being sufficiently flexible and resilient to torsionally twist in order to allow said sign to pivotally swing relative to the axis of said stand member in response to second predetermined forces exerted on said assembly in a direction generally transverse to said first predetermined forces.

22. A sign and sign stand assembly according to claim 21, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

23. A sign and sign stand assembly according to claim 22, wherein said sign is removably attached to said stand member.

24. A sign and sign stand assembly comprising: a base for supporting said assembly, a generally longitudinally-extending stand member, connecting means for connecting said stand member to said base, a sign-supporting member, attaching means for attaching said sign-supporting member to said stand member, resilient biasing means for normally biasing said stand member into a generally upright position, said resilient biasing means being resiliently yieldable to allow said stand member to deflect in a generally downward direction in response to first predetermined forces exerted on said assembly, said attaching means including second resilient biasing means interconnecting said sign-supporting member and said stand member and being resiliently yieldable to allow said sign-supporting member and said sign to pivotally swing relative to the axis of said stand member in response to second predetermined forces exerted on said assembly in a direction generally transverse to said first predetermined forces.

25. A sign and sign stand assembly according to claim 24, wherein said second resilient biasing means is yieldable in torsion.

26. A sign and sign stand assembly according to claim 24, wherein said second resilient biasing means includes an elastomeric member secured to said stand member, said elastomeric member having an opening therein for receiving said sign-supporting member in a rotationally interlocking relationship therebetween relative to the axis of said sign stand member.

27. A sign and sign stand assembly according to claim 24, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

28. A sign and sign stand assembly according to claim 27, wherein said sign-supporting member is removably attached to said stand member.

29. A sign and sign stand assembly according to claim 24, further comprising at least one retaining member adapted to be inserted through an aperture in said sign-supporting member, and through a corresponding aperture in said stand member in order to retain said sign-supporting stand member.

30. A sign and sign stand assembly comprising: a base for supporting said assembly, a generally longitudinal-extending stand member, attaching means for attaching said sign to said stand member, resilient biasing means for normally biasing said stand member into a generally upright position, said resilient biasing means being resiliently yieldable to allow said stand member to deflect in generally downward direction in response to first predetermined forces exerted on said assembly, said attaching means further including pivot means interconnecting said stand member and said base for relative predetermined pivotal movement therebetween in order to allow said stand member and said sign to pivotally swing generally relative to the axis of said stand member in response to second predetermined forces exerted on said assembly in a direction generally transverse to said first predetermined forces.

31. A sign and sign stand assembly according to claim 30, wherein said pivot means includes second resilient biasing means for normally biasing said stand member to an intermediate pivotal position relative to the axis of said stand member, said second resilient biasing means being resiliently yieldable to allow said pivotal swinging movement in opposite pivotal directions toward and away from said intermediate pivotal position.

32. A sign and sign stand assembly according to claim 31, wherein said pivot means includes a pair of pivot members, one of said pivot members being interconnected with said stand member and the other of said pivot members being interconnected with said base, said second resilient biasing means interconnnecting said pivot members.

33. A sign and sign stand assembly according to claim 31, wherein said second resilient biasing means includes at least generally spiral-wound clock-spring.

34. A sign and sign stand assembly according to claim 31, wherein said second resilient biasing means includes an elastomeric member resiliently yieldable in torsion for resiliently twisting relative to the axis of said stand member.

35. A sign and sign stand assembly according to claim 30, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

36. A sign and sign stand assembly according to claim 35, wherein said sign is removably attached to said stand member.

37. A sign and sign stand assembly comprising: a base for supporting said assembly, a generally longitudinally-extending stand member, attaching means for attaching said sign to said stand member, resilient biasing means for normally biasing said stand member into a generally upright position, said resilient biasing means being resiliently yieldable to allow said stand member to deflect in a generally downward direction in response to first predetermined forces exerted on said assembly, said attaching means further including pivot means interconnecting said stand member and said base for relative predetermined pivotal movement therebetween in order to allow said stand member and said sign to pivotally swing generally relative to the axis of said stand member in response to second predetermined forces exerted on said assembly in a direction generally transverse to said first predetermined forces, said resilient biasing means pivotally interconnecting said stand member and said base and normally biasing said stand member to an intermediate pivotal position relative to said base, said resilient biasing means being resiliently yieldable to allow said pivotal swinging movement in opposite pivotal directions toward and away from said intermediate pivotal position.

38. A sign and sign stand assembly according to claim 32, wherein said pivot means includes a pair of pivot members, one of said pivot members being interconnected with said stand member and the other of said pivot members being interconnected with said base, said resilient biasing means interconnecting said pivot members.

39. A sign and sign stand assembly according to claim 38, wherein said resilient biasing means includes an elastomeric member resiliently yieldable in torsion for resiliently twisting relative to the axis of said stand member.

40. A sign and sign stand assembly according to claim 37, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

41. A sign and sign stand assembly according to claim 40, wherein said sign is removably attached to said stand member.

42. A sign stand assembly for supporting a sign having at least one sign-supporting member, said sign stand comprising: a base, a generally longitudinally-extending stand member, connecting means for connecting said stand member to said base, and attaching means for attaching said sign to said stand member, said base including resilient biasing means for normally biasingly supporting said stand member into a generally upright position, said resilient biasing means being resiliently yieldable to allow said stand member to deflect in a generally downward direction in response to first predetermined forces exerted on said sign stand, a substantial portion of said sign-supporting member being free of said stand member and substantially unsupported thereby in order to allow the sign and at least said substantially unsupported portion of the sign-supporting member to pivotally swing relative to the axis of said stand member in response to second predetermined forces exerted on said sign stand in a direction generally transverse to said first predetermined forces.

43. A sign stand assembly according to claim 42, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

44. A sign stand assembly according to claim 43, wherein said sign-supporting member is removably attached to said stand member.

45. A sign stand assembly for supporting a sign having at least one sign-supporting member, said sign stand comprising: a base, a generally longitudinally-extending stand member, connecting means for connecting said stand member to said base, and attaching means for attaching said sign to said stand member, said base including resilient biasing means for normally biasingly supporting said stand member into a generally upright position, said resilient biasing means being resiliently yieldable to allow said stand member to deflect in a generally downward direction in response to first predetermined forces exerted on said sign stand, said attaching means being adapted for attaching said sign-supporting member to said stand member in a relatively loose relationship therewith for predetermined pivotal movement of said sign-supporting member relative to the axis of said stand member in order to allow said sign and at least a portion of said sign-supporting member to pivotally swing relative to the axis of said stand member in response to second predetermined forces exerted on said sign stand in a direction generally transverse to said first predetermined forces.

46. A sign stand assembly according to claim 45, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

47. A sign stand assembly according to claim 46, wherein said sign-supporting member is removably attached to said stand member.

48. A sign stand assembly according to claim 45, wherein said stand member includes retaining means for substantially retaining said sign-supporting member in a generally longitudinally-extending orientation thereon when said sign-supporting member is attached thereto.

49. A sign stand assembly according to claim 48, wherein said retaining means includes flange means on said stand member for substantially preventing said sign-supporting member from pivoting about an axis transverse to the axis of said stand member.

50. A sign stand assembly for supporting a sign, said sign stand comprising: a base, a generally longitudinally-extending stand member, attaching means for attaching said sign to said stand member, resilient biasing means for normally biasingly supporting said stand member into a generally upright position, said resilient biasing means being resiliently yieldable to allow said stand member to deflect in a generally downward direction in response to first predetermined forces exerted on said sign stand, said attaching means being adapted for attaching said sign to said stand member in a relatively loose relationship therewith for predetermined limited pivotal movement of said sign relative to the axis of said stand member in order to allow said sign to pivotally swing relative to the axis of said stand member in response to second predetermined forces exerted on said assembly in a direction generally transverse to said first predetermined forces.

51. A sign stand assembly according to claim 50, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

52. A sign stand assembly according to claim 51, wherein said sign is removably attached to said stand member.

53. A sign stand assemby for supporting a sign, said sign stand comprising: a base, a generally longitudinally-extending stand member, attaching means for attaching said sign to said stand member, resilient biasing means for normally biasingly supporting said stand member into a generally upright position, said resilient biasing means being resiliently yieldable to allow said stand member to deflect in a generally downward direction in response to first predetermined forces exerted on said sign stand, at least a portion of said stand member being sufficiently flexible and resilient to torsionally twist in order to allow said sign to pivotally swing relative to the axis of said stand member in response to second predetermined forces exerted on said stand in a direction generally transverse to said first predetermined forces.

54. A sign stand assembly according to claim 53, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

55. A sign stand assembly according to claim 54, wherein said sign is removably attached to said stand member.

56. A sign stand assembly for supporting a sign having at least one sign-supporting member, said sign stand comprising: a base, a generally longitudinally-extending stand member, connecting means for connecting said stand member to said base, and attaching means for removably securing said sign to said stand member, said base including resilient biasing means for normally biasingly supporting said stand member into a generally upright position, said resilient biasing means being resiliently yieldable to allow said stand member to deflect in a generally downward direction in response to first predetermined forces exerted on said sign stand, said attaching means including second resiliently biasing means interconnecting said sign-supporting member and said stand member for resiliently yielding to allow said sign-supporting member and said sign to pivotally swing relative to the axis of said stand member in response to second predetermined forces exerted on said sign stand in a direction generally transverse to said first predetermined forces.

57. A sign stand assembly according to claim 56, wherein said second resilient biasing means is yieldable in torsion.

58. A sign stand assembly according to claim 56, wherein said second resilient biasing means includes an elastomeric member secured to said stand member, said elastomeric member having an opening therein for receiving said sign-supporting member in a rotationally interlocking relationship therebetween relative to the axis of said sign stand member.

59. A sign stand assembly according to claim 56, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

60. A sign stand assembly according to claim 59, wherein said sign-supporting member is removably attached to said stand member.

61. A sign stand assembly for supporting a sign, said sign stand comprising: a base, a generally longitudinally-extending stand member, attaching means for attaching said sign to said stand member, resilient biasing means for normally biasingly supporting said stand member into a generally upright position, said resilient biasing means being resiliently yieldable to allow said stand member to deflect in a generally downward direction in response to first predetermined forces exerted on said sign stand, said attaching means further including pivot means interconnecting said stand member and said base for relative predetermined pivotal movement therebetween in order to allow said stand member and said sign to pivotally swing generally relative to the axis of said stand member in response to second predetermined forces exerted on said assembly in a direction generally transverse to said first predetermined forces.

62. A sign stand assembly according to claim 61, wherein said pivot means includes second resilient biasing means for normally biasing said stand member to an intermediate pivotal position relative to the axis of said stand member, said second resilient biasing means being resiliently yieldable to allow said pivotal swinging movement in opposite pivotal directions toward and away from said intermediate pivotal position.

63. A sign stand assembly according to claim 62, wherein said pivot means includes a pair of pivot members, one of said pivot member being interconnected with said stand member and the other of said pivot members being interconnected with said base, said second resilient biasing means interconnecting said pivot members.

64. A sign stand assembly according to claim 62, wherein said second resilient biasing means includes at least one generally spiral-wound clock-spring.

65. A sign stand assembly according to claim 62, wherein said second resilient biasing means includes an elastomeric member resiliently yieldable in torsion for resiliently twisting relative to the axis of said stand member.

66. A sign stand assembly according to claim 61, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

67. A sign stand assembly according to claim 66, wherein said sign is removably attached to said stand member.

68. A sign stand assembly for supporting a sign, said sign stand comprising: a base, a generally longitudinally-extending stand member, attaching means for attaching said sign to said stand member, resilient biasing means for normally biasingly supporting said stand member into a generally upright position, said resilient biasing means being resiliently yieldable to allow said stand member to deflect in a generally downward direction in response to first predetermined forces exerted on said sign stand, said attaching means further including pivot means interconnecting said stand member and said base for relative predetermined pivotal movement therebetween in order to allow said stand member and said sign to pivotally swing generally relative to the axis of said stand member in response to second predetermined forces exerted on said assembly in a direction generally transverse to said first predetermined forces, said resilient biasing means pivotally interconnecting said stand member and said base and normally biasing said stand member to an intermediate pivotal position relative to said base, said resilient biasing means being resiliently yieldable to allow said pivotal swinging movement in opposite pivotal directions toward and away from said intermediate pivotal position.

69. a sign stand assembly according to claim 68, wherein said pivot means includes a pair of pivot members, one of said pivot members being interconnected with said stand member and the other of said pivot members being interconnected with said base, said resilient biasing means interconnecting said pivot members.

70. A sign stand assembly according to claim 69, wherein said resilient biasing means includes an elastomeric member resiliently yieldable in torsion for resiliently twisting relative to the axis of said stand member.

71. A sign stand assembly according to claim 68, wherein said base includes at least one leg thereon, said leg being selectively retractable into a shortened configuration or extendible into an elongated configuration, said leg further being pivotal between a first generally longitudinally-extending position and a second position generally transverse and outwardly-extending relative to said stand member, said stand member and said base having a combined overall length approximately equal to the length of said leg when in said shortened configuration.

72. A sign stand assembly according to claim 71, wherein said sign is removably attached to said stand member.

* * * * *

UNITED STATES PATENT AND TRADEMARK OFFICE

CERTIFICATE OF CORRECTION

PATENT NO. : 4,691,892

DATED : September 8, 1987

INVENTOR(S) : GREWE, Ronald E. et al

It is certified that error appears in the above-identified patent and that said Letters Patent is hereby corrected as shown below:

| | |
|---|---|
| Col. 5, Line 46, | "legs" should be --leg-- |
| Col. 8, Line 49, | "13. It" should be --13, it-- |
| Col. 9, Line 25, | "surface" should be --surfaces-- |
| Col. 9, Line 40, | "this" should be --the-- |
| Col. 10, Line 20, | "the" should be --The-- (1st occurrence) |
| Col. 11, Line 40, | "on" should be --in-- |
| Col. 13, Line 24, | "lieu" should be --in lieu-- |
| Col. 13, Line 48, | "spirng" should be --spring-- |
| Col. 14, Line 12, | "sig-pivoting" should be --sign-pivoting-- |

UNITED STATES PATENT AND TRADEMARK OFFICE

CERTIFICATE OF CORRECTION

PATENT NO. : 4,691,892

DATED : September 8, 1987

INVENTOR(S) : GREWE, Robert E. et al

It is certified that error appears in the above-identified patent and that said Letters Patent is hereby corrected as shown below:

Col. 17, Line 21, Claim 19,
Line 4, Claim 19 — insert "sign" after "said"

Col. 18, Line 46, Claim 30,
Line 6, Claim 30 — insert "a" before "generally"

Col. 21, Line 51, Claim 53,
Line 1, Claim 53 — "assemby" should be —assembly—

Col. 24, Line 21, Claim 69, "a" should be --A--
Line 1, Claim 69, "a" should be --A--

Col. 23, Line 16, Claim 63,
Line 2, Claim 63 — "member" should be --members--

Signed and Sealed this

Thirty-first Day of May, 1988

Attest:

DONALD J. QUIGG

Attesting Officer

Commissioner of Patents and Trademarks